United States Patent [19]

Schäfer et al.

[11] Patent Number: 5,031,796
[45] Date of Patent: Jul. 16, 1991

[54] VENTILATING SYSTEM FOR GARBAGE CONTAINERS

[75] Inventors: Gerhard Schäfer, Neunkirchen-Salchendorf; Rainer Kowald, Linden, both of Fed. Rep. of Germany

[73] Assignee: Fritz Schäfer Gesellschaft mit beschränkter Haftung, Neunkirchen-Salchendorf, Fed. Rep. of Germany

[21] Appl. No.: 531,858

[22] Filed: May 31, 1990

[30] Foreign Application Priority Data

Mar. 8, 1989 [DE] Fed. Rep. of Germany ....... 3907475

[51] Int. Cl.$^5$ .............................................. B65D 1/38
[52] U.S. Cl. .................................. 220/571; 220/366; 220/371; 220/908; 220/913; 220/DIG. 6
[58] Field of Search ............... 220/913, 671, 366, 369, 220/DIG. 6, 908, 571

[56] References Cited

U.S. PATENT DOCUMENTS

| | | | |
|---|---|---|---|
| 1,130,086 | 3/1915 | Hobbs | 220/913 |
| 1,161,727 | 11/1915 | Randall | 220/913 |
| 2,005,641 | 6/1935 | Stanitz et al. | 220/671 |
| 2,438,844 | 3/1948 | Dale | 220/671 |
| 2,938,649 | 5/1960 | Debs | 220/671 |
| 3,342,368 | 9/1967 | Matry | 220/913 |
| 4,125,187 | 11/1978 | Vecchiotti | 220/671 |
| 4,597,503 | 7/1986 | Lates | 220/913 |

FOREIGN PATENT DOCUMENTS 3517262 5/1985 Fed. Rep. of Germany.
0271719 11/1987 Fed. Rep. of Germany.
8815827 12/1988 Fed. Rep. of Germany.

Primary Examiner—Joseph Man-Fu Moy
Attorney, Agent, or Firm—Toren, McGeady & Associates

[57] ABSTRACT

A ventilating system for a garbage container. The container includes a vessel for receiving wastes and a cover. The receiving vessel has walls which are at least over portions thereof provided with air passage openings. An air-permeable intermediate wall is arranged spaced above the vessel bottom for carrying the waste. The intermediate wall is a grate with meshes formed by grate members. The meshes have a width which is substantially greater than the width of the grate members. The walls of the receiving vessel define air inlet openings in the region of the grate. Additional ventilation openings are provided in the walls underneath the opening of the receiving vessel. Spacer members for the wastes are provided on the inner surfaces of the walls of the receiving vessel at least over the portion of the walls which extends vertically above the grate. The cover is provided with air discharge openings.

25 Claims, 3 Drawing Sheets

VENTILATING SYSTEM FOR GARBAGE CONTAINERS

BACKGROUND OF THE INVENTION

1. Field of the Invention

The present invention relates to a ventilating system for a garbage container for receiving waste which can be composted. The garbage container includes a receiving vessel which can be closed by means of a cover, particularly a folding cover. The receiving vessel has walls which are at least over portions thereof provided with air passage openings. The receiving vessel further includes an air-permeable intermediate wall arranged spaced above the vessel bottom for carrying the waste.

2. Description of the Related Art

A garbage container for receiving waste which can be composted is already known from German Offenlegungsschrift 6 42 761. This known container has above the vessel bottom a screen insert formed by a perforated sheet for carrying the waste. The screen insert is hinged as a folding wall to the interior of the receiving vessel. Moreover, the side walls of the receiving vessel of this garbage container are provided with air passage openings below the screen insert and spaced below the edge of the opening of the vessel.

It has been found in practice that in such a garbage container the decomposition of the wastes which are capable of composting takes place aerobically only to a small extent. In other words, the decomposition takes place predominantly anerobically and, thus, generates undesirable odors.

The reason for this predominantly anaerobic decomposition of wastes which are capable of composting is the fact that the layers of waste which are formed or built up over different times are only insufficiently ventilated. Since the water content of the lower waste layers is continuously increased due to seepage water, even those decomposition processes which initially take place aerobically are interrupted and are subsequently changed to anaerobic decomposition processes.

SUMMARY OF THE INVENTION

It is, therefore, the primary object of the present invention to provide a ventilating system for garbage containers for receiving waste which can be composted, in which aerobic decomposition processes are generated and maintained with simple means and in which anaerobic decomposition processes are counteracted more than in the past.

In accordance with the present invention, the above object is met by a container in which the intermediate wall is a grate formed by grate members with meshes which have a width which is large in relation to the width of the grate members. The walls of the receiving vessel are provided with air inlet openings in the region of the grate. Additional ventilation openings are provided in the walls underneath the edge of the opening of the receiving vessel. Preferably, spacer members for the waste are provided on the inner surfaces of the walls of the receiving vessel at least over the portion of the walls which extends vertically above the grate. Finally, the cover is provided with air discharge openings.

In accordance with an important feature, the total cross-sectional area of the ventilation openings and the air discharge openings corresponds to a multiple of the total cross-sectional area of the air inlet openings.

It has been found that the ventilating system constructed in accordance with the present invention makes it possible to substantially improve the aerobic decomposition process in the wastes which are capable of composting. Specifically, while preventing undesirable odors, it was possible to reduce the mass of the waste over a period of time of 14 days by 13% of the fresh amount of waste. In contrast, when garbage containers of the above-described known type are used, a reduction in mass of only 6% of the fresh amount of waste was possible over the same period of time, while generating undesirable odors because the process takes place predominantly anaerobically. Thus, the reduction in mass can be doubled by means of the ventilating system according to the present invention. At the same time, the amount of water collected in the garbage container according to the present invention during the storage of the waste was approximately 40.3% of the amount of water remaining over the same period of time when the known garbage container is used.

It has been found particularly useful if the ratio of the width of the meshes to the width of the grate members of the grate serving as an intermediate wall is approximately between 10:1 and 15:1.

In the simplest case, the grate may be a wire grate in which the individual wires have a diameter of, for example, 2 mm, so that the individual meshes have a side length of between 20 and 30 mm. Of course, it would also be possible to use grates whose grate members are made of strip material which is placed on edge.

Another feature of the present invention provides that the air inlet openings are arranged in the vessel walls, particularly in the vessel side walls, underneath the plane in which the grate is mounted, but above the vessel bottom. On the other hand, in accordance with another recommended feature, a greater portion, for example, ⅔, of the air inlet openings are arranged underneath the plane of the grate and a smaller portion, for example, ⅓, are arranged above the plane of the grate in the vessel walls, particularly the vessel side walls.

Another advantageous feature of the present invention provides that the air inlet openings are arranged in the form of circular groups of holes in opposite side walls of the receiving vessel. The ventilation openings may also preferably be arranged in the form of circular groups of holes in the center of oppositely located side walls. Preferably, the type of arrangement of the air inlet openings is the same as that of the ventilation openings.

Of course, a plurality of small holes can also be replaced by one or several large openings, for example, slots.

In accordance with a particularly useful feature of the ventilating system according to the present invention, the spacer members are ribs or webs which project from the inner surfaces of the walls of the receiving vessel and extend upwardly.

If the spacer members are ribs or webs, it is recommended to integrally form these spacer members with the inner surfaces of the walls of the receiving vessel, in such a way that they extend at least over the height thereof which extends above the grate.

It is also possible to provide at least some ribs or webs underneath the plane of the grate. In this case, the web or webs have a greater sectional height than the webs provided above the grate, so that the free end surfaces of the web or webs can form support surfaces for the grate. The grate may be mounted loosely placed on the ribs. However, it is particularly recommended to mount the grate within the receiving vessel so as to be foldable by means of hinges. It has been found that the ventilating system operates best if the normal sectional height of the ribs or webs is between 5 and 25 mm.

In accordance with another development, at least the individual holes forming the air discharge opening have a diameter which is at least equal to the thickness of the walls of the vessel and of the cover. Preferably, the holes have a diameter of 4 mm. This makes it possible to prevent the formation of films or drops of condensation water which could span across the cross-sections of the air discharge openings and, thus, could prevent the escape of water vapor. Air discharge openings in the form of slots may serve the same purpose.

Another advantageous feature of the present invention provides that the ratio of the total cross-sectional area of the ventilation openings in the side walls of the receiving vessel and the air discharge openings in the cover to he total cross-sectional area of the air inlet openings is approximately 10:1. As a result, the heat generated by the aerobic decomposition process essentially builds up a convection flow within the garbage container which not only has the effect to conduct most of the water contained in the wastes and generated during the decomposition process toward the top in the form of water vapor and out of the garbage container, but simultaneously causes an intensive flow of oxygen-rich air from the outside into the interior of the waste container and, thus, ensures that the aerobic decomposition process is maintained.

A further development of the present invention provides that the ratio of the total cross-sectional area of the air discharge openings in the cover to the total cross-sectional area of the air inlet openings is approximately 9:1. Consequently, ventilation openings may be provided in the side walls of the receiving vessel whose total cross-sectional area is approximately equal to the total cross-sectional area of the air inlet opening.

If the garbage container with the ventilating system according to the present invention is placed in the open air and, thus, is also subjected to the influence of rain, it is advantageous to provide the air discharge openings in the container cover spaced apart and underneath a protective rain cover which can be mounted subsequently as an added element on the container cover.

However, it is also conceivable to surround the air discharge openings with an upwardly extending collar or to arrange them between upwardly extending ribs or webs. Any water reaching the outer side of the cover can then flow off without reaching the interior of the garbage container. The entire cover may also be replaced by a ventilating groove to be placed on the receiving vessel.

In accordance with another feature of the invention, the portion of the receiving vessel located underneath the intermediate wall and also underneath the air inlet openings may form a water collecting space in which the water discharged from the wastes can be collected. This is desirable because the water has a pH-value which more or less significantly deviates from that of pure water. Usually, the pH-value is below 7 and, thus, the water is acidic. In addition, the water contains a significant amount of organic material.

Finally, it may be useful to provide the water collecting space with a water outlet. The opening of the water outlet may be slightly above the uppermost filling level of the water collecting space at the end wall of the receiving vessel where the opening may be connected to a water reservoir of a garbage removal vehicle, particularly if the garbage container is emptied into the garbage removal vehicle by means of a lifting and tilting device. In this manner, it is ensured that not only the wastes which are subjected to the aerobic decomposition process are removed in an environmentally acceptable manner, but also the water which is simultaneously collected and is acidic and contains harmful material. In addition, the wastes and the water can be properly purified before being used again.

However, it is also possible to form a shaft or the like within the receiving vessel which shaft extends from the water collecting space to the upper edge of the receiving vessel and from which the water can flow out when the container is emptied. The water may also be removed from the water collecting chamber by means of suction before the receiving vessel itself is emptied.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENT

Figure 1:
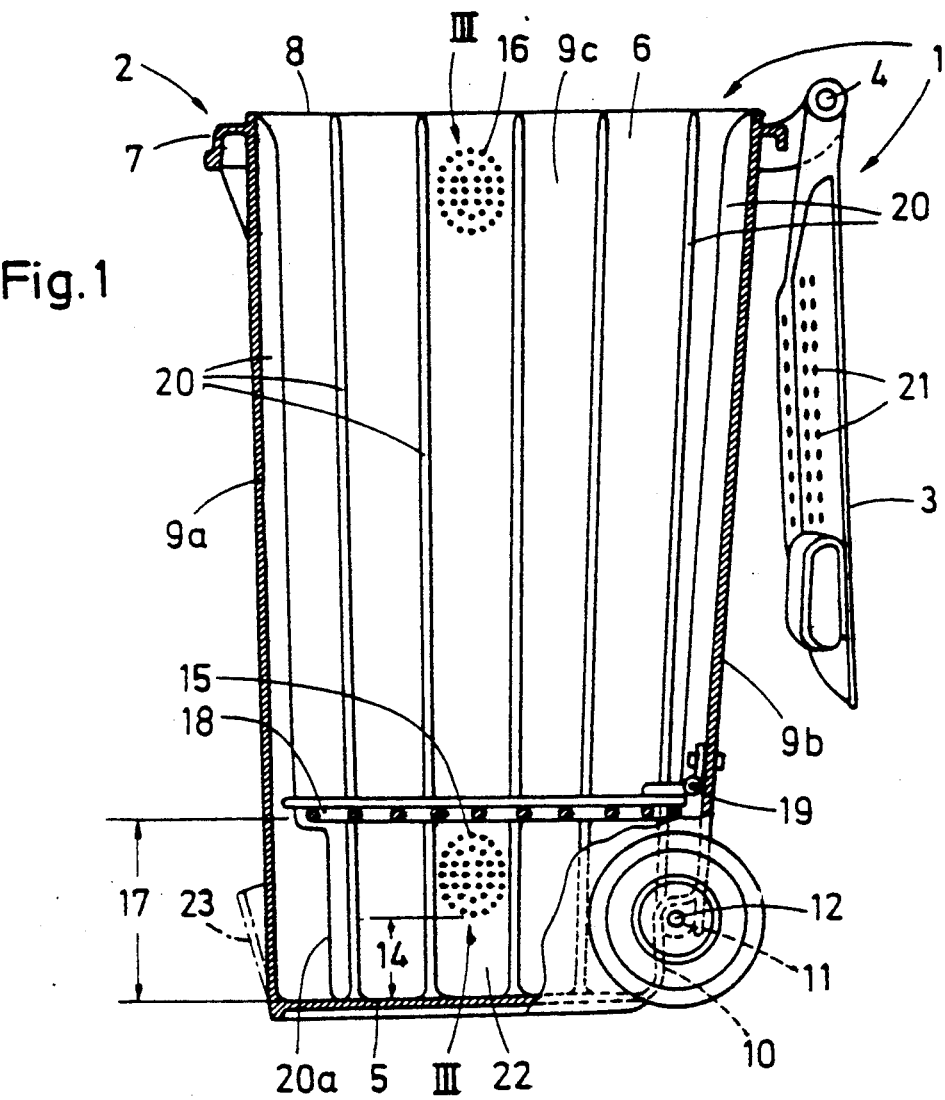
FIG. 1 is a vertical sectional view of a garbage container taken along sectional line I—I in FIG. 1.
Figure 2:
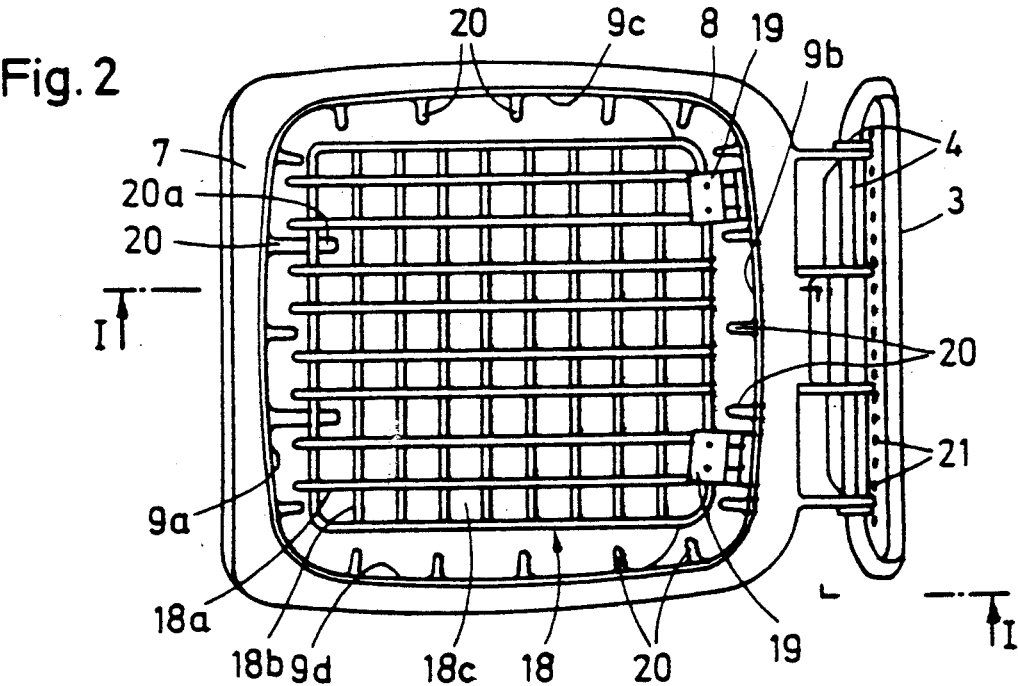
FIG. 2 is a top view of the garbage container of FIG. 1, with the cover being open.

FIGS. 1 and 2 of the drawing show a garbage container 1 which is constructed essentially in the form of a standard garbage container. The garbage container 1 includes a receiving vessel 2 and a folding cover 3 which is in continuous connection with the vessel 2 by means of hinges 4. The receiving vessel 2 and the folding cover 3 are usually constructed as molded articles of plastics material. However, they may also be manufactured from other materials.

The receiving vessel 2 of the garbage container 1 usually has an essentially rectangular or square cross-section and is closed at the bottom by an integrally formed bottom wall 5. The upper opening 6 of the receiving vessel is defined toward the outside by a collar-like profiled reinforcing edge 7. An edge 8 of the opening extends above the edge 7. The reinforcing edge 7 is constructed in such a way that it can be grasped by a lifting and tilting device of a garbage removal vehicle if the garbage container 1 is to be emptied into the vehicle. The opening edge 8 is connected to the reinforcing edge 7 as an extension of the front wall 9a, the rear wall 9b and the side walls 9c and 9d of the receiving vessel 2.

As shown in FIG. 1, an indentation 10 is formed adjacent the bottom wall 2 in the rear wall 9b of the receiving vessel 2. The indentation 10 includes bearing eyes 11 in which an axle 12 is mounted. Running wheels 13 are rotatably mounted on the two ends of the axle 12. Thus, the garbage container 1 can be moved without problems by means of the two wheels 13, wherein the hinges 4 which connect the cover 3 with the receiving vessel 2 can be used in the conventional manner as handles for manipulating the garbage container 1.

As FIG. 1 further shows, the side walls 9c and 9d of the receiving vessel 2 have a plurality of air inlet openings 15 which are spaced above the bottom wall 5 at a distance 14. The air inlet openings 15 are provided, for example, in the form of a circular arrangement of holes. The circular arrangement of holes forming the air inlet openings 15 is preferably provided at a location of the respective side walls 9c, 9d which is approximately in the middle between the indentation 10 of the rear wall 9b and the front wall 9a. Ventilating openings 16 in the form of a similar circular arrangement of holes are provided in the two side walls 9c, 9d of the receiving vessel 2 at a location which is immediately underneath the reinforcing edge 7 and approximately at half the width of the side walls 9c, 9d. It is also possible to provide several circular arrangements of holes in the side walls 9c, 9d and/or in the front wall 9a and the rear wall 9b.

A grate 18 is mounted within the receiving vessel 2 so as to be pivotable about hinges 19 at the rear wall 9b provided at a distance 17 above the bottom wall 5. The grate 18 is pivotable between a plane extending parallel to the bottom wall 5 and a position which extends at least approximately parallel to the rear wall 9b.

In its supported position extending parallel to the bottom wall 5, the grate 18 forms in the receiving vessel 2 an intermediate wall or waste carrier which prevents wastes which are filled into the receiving vessel from falling down to the bottom wall 5.

It has been found useful if the grate 18 is formed as a wire grate in which the ratio of the side length of the individual grate meshes 18c to the cross-section of the longitudinally extending grate rods 18a and the transversely extending grate rods 18b is approximately between 10:1 and 15:1, respectively. Thus, when the cross-sectional width of the grate rods 18a and 18b is, for example, 2 mm, the side length of the individual meshes 18c may be between 20 and 30 mm.

Of course, instead of a grate 18 made from wire rods, it is also possible to use a grate 18 which is made of flat strip material which is placed on edge, if this is considered useful.

Special spacer members are provided within the receiving vessel 2 on the front wall 9a, the rear wall 9b and the two side walls 9c and 9d at least above the mounting plane of the grate 18 determined by the piston 17.

In the embodiment illustrated in FIGS. 1 and 2, the spacer members are formed by ribs or webs 20 which project from the inner surfaces of the front wall 9a, the rear wall 9b and the side walls 9c and 9d of the receiving vessel 2 and which extend upwardly. If the receiving vessel 2 is a molded article of plastics material, the ribs or webs 20 can be formed integrally with the inner surfaces of front wall 9a, rear wall 9b and side walls 9c and 9d in such a way that the free end edges of the ribs or webs 20 extend closely to the outer circumference of the grate 18, as shown in FIG. 2. Advantageously, the ribs or webs 20 may also extend to the bottom 5 of the receiving vessel 2. Some of these ribs or webs may have a greater sectional height 20a over the distance 17 and the upper edges then form a support for the grate 18.

In practice, it has been found useful if the ribs or webs 20 forming the spacer members have a normal sectional height in the portions thereof extending above the grate 18 which is between 5 and 25 mm.

Figure 4:
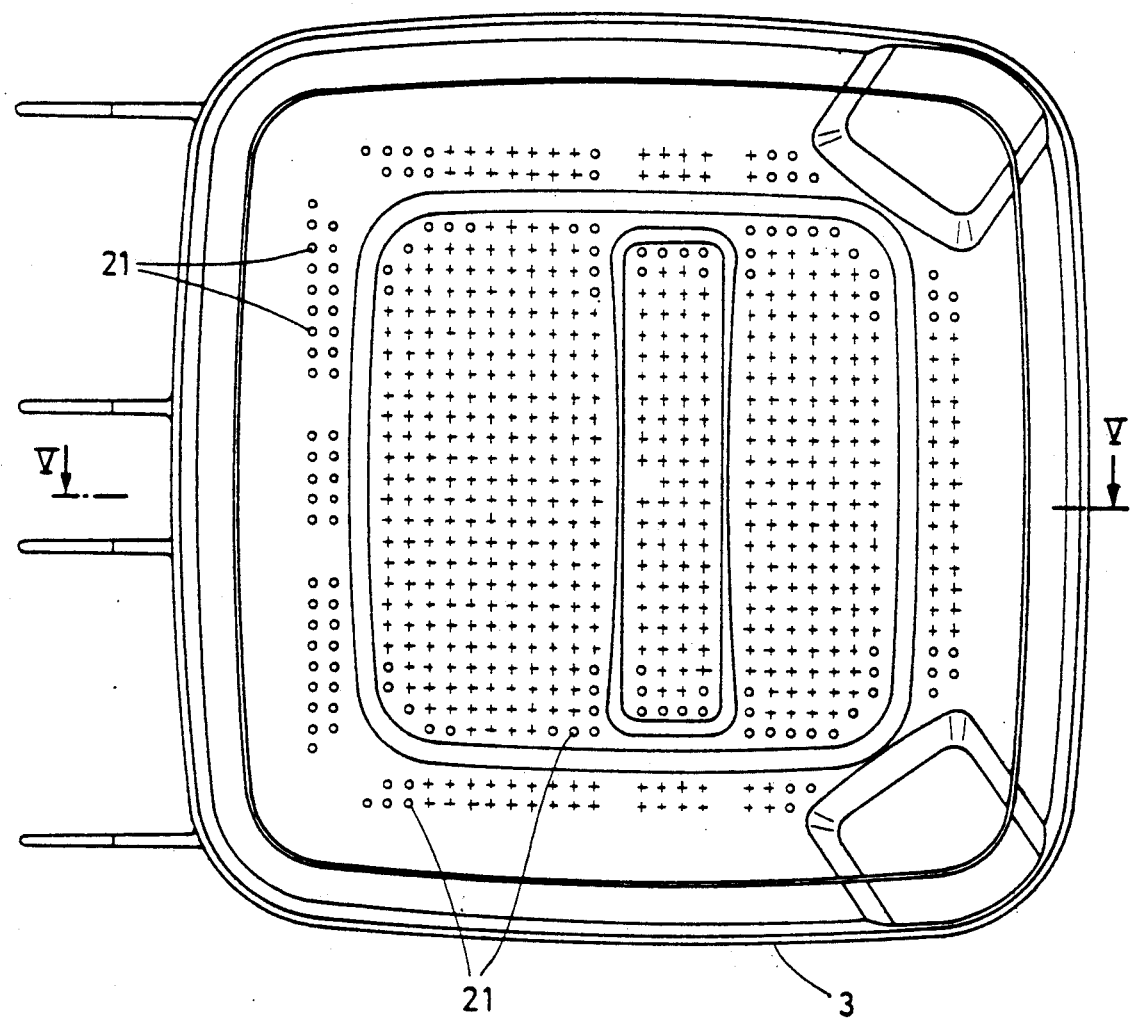
FIG. 4 is a bottom view, also on a larger scale, of the cover of the garbage container shown in FIGS. 1 and 2.
Figure 5:
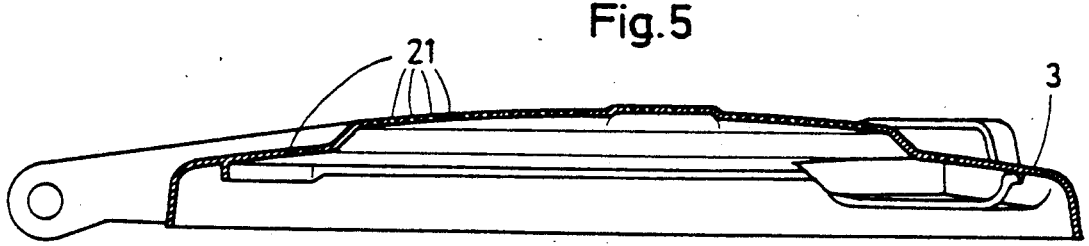
FIG. 5 is a sectional view of the cover taken along sectional line V—V of FIG. 4.

As can be seen in FIGS. 1 and 2, and particularly in FIGS. 4 and 5, the folding cover 3 is provided with a large number of air discharge openings 21 which are distributed over the entire surface area of the cover. Similarly to the air inlet opening 15 and the ventilating openings 16, the air discharge openings 21 are also formed by round holes. However, it is not necessary that the air discharge openings are relatively small round holes. Rather, they may also be larger slots or the like.

The total cross-sectional area of the ventilating openings 16 and the air discharge openings 21 may be dimensioned to correspond to a multiple of the total cross-sectional area of the air inlet openings 15. For example, the ratio may be 10:1. The ratio of the cross-sectional area of the ventilating openings 16 in the side walls 9c and 9d of the receiving vessel 2 to the air inlet openings 15 is preferably 1:1. This means that the ratio of the cross-sectional area of the air discharge openings 21 to the cross-sectional area of the air inlet openings 15 is 9:1.

An important feature of the ventilating openings 16 and particularly the air discharge openings 21 in the cover 3 may be that each individual round hole of the openings has a diameter which is at least equal to the wall thickness of the receiving vessel 2 or the cover 3 and is preferably at least 4 mm. This is because it has been found that this size of the holes makes it possible to counteract any undesirable closings of the individual holes by films or drops of condensation water. However, the same effect can also be achieved if particularly the air discharge openings 21 in the cover 3 have the form of slots or the like.

Figure 3:
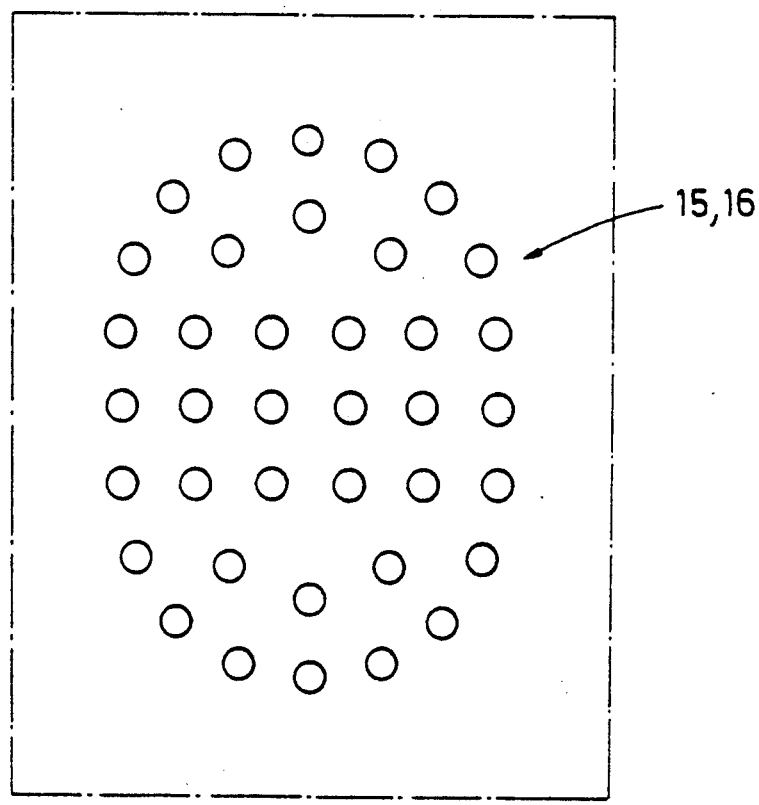
FIG. 3 is a side view, on a larger scale, of portions of the garbage container indicated in FIG. 1 by arrows III.

While the periphery of the arrangement of holes for the air inlet openings 15 and the ventilating openings 16 is essentially circular, FIG. 3 shows an arrangement of holes which has an oblong or approximately oval periphery.

An arrangement of holes with oval or oblong periphery can be used advantageously for forming the air inlet openings 15 when these openings are not all to be located underneath the mounting plane of the grate 18, as is shown in FIG. 1, but if a portion of the openings is to be located above and a portion below the mounting plane of the grate 18. Thus, it is possible in a simple manner to provide the oblong or oval arrangement of holes to a greater extent, for example, ⅔, below the mounting plane of the grate 18 and to a smaller extent, for example, ⅓, above the mounting plane of the grate 18.

The wastes which are capable of composting and which are filled into the receiving vessel 2 of the garbage container 1 are supported by the grate 18, so that the space underneath the grate 18 remains free of waste. The spacer members in the form of ribs or webs 20 at the inner surfaces of the front wall 9a, rear wall 9b and side walls 9c and 9d prevent the waste from coming into close contact with the walls.

Oxygen-rich air which is introduced underneath the grate 18 through the air inlet openings 15 can penetrate the wastes from below and can also flow upwardly along the inner surfaces of the receiving vessel 2 in the region of the ribs or webs 20. The oxygen-rich air starts an aerobic decomposition in the wastes which leads to the development of substantial heat. This heat development then results in a convection flow within the garbage container 1.

A consequence of the heat development within the garbage container 1 is that most of the water contained in the wastes changes into the steam phase and is conducted upwardly with the convection flow where it is conducted to the outside through the air discharge openings 21 and possibly the ventilating openings 16.

The upward flow of the steam is intensified by the fact that the total cross-sectional area of the air discharge openings 21 in the cover 3 is greater than that of the air inlet openings 15.

The fact that a portion of the air introduced through the air inlet openings 15 flows upwardly in the region of the ribs or webs 20 along the inner surfaces of the receiving vessel 2 prevents the water vapor which is generated in the vessel from condensing on the wall surfaces of the receiving vessel 2. As a result, only relatively small amounts of water reach the lower portion of the receiving vessel in liquid form. In the lower portion of the receiving vessel, the water is collected in a reservoir 22 located above the bottom wall 2 and below the air inlet opening 15.

To ensure that the water collected in the reservoir 22 is not reintroduced into the waste subjected to the aerobic decomposition process when the garbage container 1 is emptied by means of the lifting and tilting device of the garbage removal vehicle, a separate means for emptying the reservoir 22 should be provided. For this purpose, the reservoir 22 could be provided with a water outlet 23 whose opening is located slightly above the highest possible filling level of the reservoir and is provided on the front wall 9a, as shown in dash-dot lines in FIG. 1. The opening of the water outlet 23 could be moved by means of the lifting and tilting device over a water container mounted on the garbage removal vehicle in such a way that the water in the reservoir 22 flows into this water container before the actual emptying procedure of the waste container 1 for the waste contained in the container is started. The same effect could also be achieved by a shaft extending from the water reservoir 22 toward the opening 6 of the receiving vessel 2, wherein the water flows through the shaft when the container is emptied. Finally, the water could also be removed by suction prior to the actual emptying procedure of the container.

It should also be mentioned that, when the garbage container 1 is placed in the open air, it is advantageous to protect the air discharge openings 21 in the cover 3 against the undesirable penetration of rain water. In the simplest case, this can be done by mounting a separate rain protection roof on top of and spaced from the cover 3. This rain protection roof may have the same peripheral shape as the cover 3 and may be locked, glued or screwed to the rim of the cover by means of spacer webs.

To prevent water from penetrating, it is also possible to provide annular, upwardly extending collars around the air discharge openings or to provide the air discharge openings 21 between upwardly extending webs or ribs which are mounted on the upper side of the cover 3.

Finally, it would also be possible to replace the cover 3 by a special rain roof which extends over the opening 6 of the receiving vessel 2.

While specific embodiments of the invention have been shown and described in detail to illustrate the application of the inventive principles, it will be understood that the invention may be embodied otherwise without departing from such principles.

We claim:

1. In a ventilating system for a garbage container for receiving wastes which can be composted, the garbage container including a receiving vessel defining an opening and having a bottom, and a cover for closing the opening of the receiving vessel having a front wall, a rear wall and side walls some of which being at least over portions thereof provided with air passage openings, the receiving vessel further including an air-impermeable intermediate wall arranged spaced above the vessel bottom for carrying the wastes, the improvement comprising the intermediate wall be a grate formed by grate members defining meshes which have a width which is substantially larger than the width of the grate members, the walls of the receiving vessel defining air inlet openings in the region of the grate, additional ventilation openings being provided in the walls underneath the opening of the receiving vessel, and spacer members for the wastes being provided on inner surfaces of the walls of the receiving vessel at least over portions of the walls which extend vertically above the grate, wherein the cover defines air discharge openings, and wherein a portion of the receiving vessel underneath the grate and underneath the air inlet openings defines a water collecting space.

2. The ventilating system according to claim 1, wherein the total cross-sectional area of the ventilation openings and the air discharge openings is a multiple of the total cross-sectional area of the air inlet openings.

3. The ventilating system according to claim 1, wherein the ratio of the width of the meshes to the width of the grate members of the grate is approximately between 10:1 and 15:1.

4. The ventilating system according to claim 1, wherein the air inlet openings are provided underneath the grate and above the vessel bottom.

5. The ventilating system according to claim 4, wherein the air inlet openings are provided in the side walls of the receiving vessel.

6. The ventilating system according to claim 1, wherein a greater portion of the air inlet openings is provided underneath the grate and a smaller portion of the air inlet openings is provided above the grate.

7. The ventilating system according to claim 6, wherein ⅔ of the air inlet openings are arranged below the grate and ⅓ of the air inlet openings are arranged above the grate.

8. The ventilating system according to claim 6, wherein the air inlet openings are provided in the side walls.

9. The ventilating system according to claim 1, wherein the air inlet openings are arranged in circular groups of holes in the side walls of the receiving vessel.

10. The ventilating system according to claim 1, wherein the ventilation openings are arranged in circular groups of holes in the middle of the side walls of the receiving vessel.

11. The ventilating system according to claim 1, wherein the spacer members are webs projecting from the walls of the receiving vessel and extending vertically.

12. The ventilating system according to claim 11, wherein the webs are integrally formed with the walls of the receiving vessel and extend at least to a height above the grate.

13. The ventilating system according to claim 12, wherein at least a portion of the webs also extends below the grate, the portions of the webs extending below the grate having a greater sectional height than the web portions extending above the grate, wherein the web portions extending below the grate define support surfaces for the grate.

14. The ventilating system according to claim 13, wherein at least the web portions extending above the grate have a sectional height of between 5 and 25 mm.

15. The ventilating system according to claim 1, wherein the air discharge openings in the cover each have a diameter which corresponds to the thickness of the cover and of the walls of the receiving vessel.

16. The ventilating system according to claim 15, wherein the diameter of the air discharge openings is 4 mm.

17. The ventilating system according to claim 1, wherein the air discharge openings are slots.

18. The ventilating system according to claim 1, wherein the ratio of the total cross-sectional area of the air discharge openings and of the ventilation openings to the total cross-sectional area of the air inlet openings is approximately 10:1.

19. The ventilating system according to claim 1, wherein the ratio of the total cross-sectional area of the air discharge openings in the cover to the total cross-sectional area of the air inlet openings is approximately 9:1.

20. The ventilating system according to claim 1, comprising a protective rain cover on the container cover, such that the air discharge openings are spaced apart and underneath the protective rain cover.

21. The ventilating system according to claim 1, wherein the water collecting space includes a water outlet, the water outlet having an opening located slightly above a maximum filling level of the water collecting space and at the front wall of the receiving vessel, the opening of the water outlet being connectible to a water reservoir of a garbage removal vehicle.

22. The ventilating system according to claim 1, wherein the water collecting space defines a water outlet located closely adjacent the bottom of the receiving vessel, the water outlet being connectible to a suction device.

23. The ventilating system according to claim 1, comprising a water discharge shaft extending from the water collecting space to the opening of the receiving vessel.

24. The ventilating system according to claim 1, wherein the cover is a folding cover hinged to the receiving vessel.

25. The ventilating system according to claim 1, wherein the cover is a ventilation roof placed on the receiving vessel.

* * * * *

UNITED STATES PATENT AND TRADEMARK OFFICE
CERTIFICATE OF CORRECTION

PATENT NO. : 5,031,796
DATED     : July 16, 1991
INVENTOR(S) : Gerhard Schäfer and Rainer Kowald It is certified that error appears in the above-identified patent and that said Letters Patent is hereby corrected as shown below:

In Claim 1, column 8, line 12 of the patent, change " impermeable" to --permeable--;

In claim 1, column 8, line 14 of the patent, change "be" to --being--.

Signed and Sealed this

Thirteenth Day of April, 1993

Attest:

STEPHEN G. KUNIN

*Attesting Officer*           *Acting Commissioner of Patents and Trademarks*